Patented Aug. 24, 1937

2,091,075

UNITED STATES PATENT OFFICE 2,091,075

MOTHPROOFING COMPOSITIONS

Bernard L. Landers, Brookline, Mass., assignor to Philipp Brothers, Inc., a corporation of New York No Drawing. Application June 29, 1934, Serial No. 733,122

2 Claims. (Cl. 167—37)

This invention relates to mothproofing compositions, and more particularly to a composition of matter for and method of rendering fabrics, yarns, knitted goods, woolens, silks, furs, feathers, and animal fibers in general free from attack by moth larvae and other fabric pests.

It is well known that textiles of wool and other animal fibers are greatly susceptible to attack by moth larvae, and many compositions and methods of treatment have been suggested in the prior art for rendering fabrics immune from attack by these and other similar pests. For example, it has been proposed to bring materials such as naphthalene, carbon tetrachloride, sulphur fumes, and the like directly into contact with the fabrics. These and other similar materials, however, offer only temporary relief since they do not prevent the development of the larvae but merely delay it. Moreover, such materials are more or less obnoxious by reason of their odors, and in some cases are even destructive of surroundings, sulphur fumes, for example, being likely to bleach wall paper and fabrics and to tarnish metals. Other prior art proposals have included placing the fabrics in cold storage. This is not only impractical as a constant measure of safety but also fails as an absolute preventative because it merely inhibits the hatching of eggs without destroying insect life, and the eggs very often hatch and develop into larvae after removal of the fabrics from storage. It has also been proposed to fumigate with materials such as hydrocyanic-acid gas the premises where moths and other pests make their nests, and while this remedy is fairly effective, it is very dangerous to human life unless applied by an expert. Various other prior art proposals are similarly objectionable, being generally only temporary in character and ineffective in results.

It has long been recognized that the only effective remedy for protecting fibers from attack by insect pests is to incorporate within the fibers themselves some insect repelling means which is permanent in character. To this end, it has been proposed to treat the fibers with certain compounds of fluorides, but always, so far as I am aware, in acid solutions. I have found that the effectiveness of these substances is materially reduced when applied in acid solutions by reason of the fact that such solutions cannot effectively penetrate the fibers to the utmost advantage, and the primary object of my invention is to provide an improved mothproofing composition which is free from the defects and disadvantages of prior art compositions and mothproofing methods.

Another object of my invention is to provide an improved mothproofing composition which will easily, quickly, and effectively penetrate the fibers.

Still another object of my invention is to provide an improved mothproofing composition which will effectively and relatively permanently render animal fibers immune from attack by moth and other insect larvae.

A further object of my invention is to provide an improved mothproofing composition which is odorless and stainless, which will not soil or otherwise detrimentally affect fabrics, which will not tender the fibers or decompose the dyes, and which will be harmless to even the most delicate fabrics.

Still a further object of my invention is to provide an improved mothproofing composition which can be applied directly to fabrics without first requiring preliminary treatment thereof.

It is another object of my invention to provide an improved composition of matter which will have cleansing as well as mothproofing properties.

And still another and important object of my invention is to provide a composition of the type set forth which is economical in cost and which is especially fit for household use in connection with finished fabrics.

In accordance with my invention, I provide a mothproofing composition which produces a distinctly alkaline solution, and I incorporate therein a penetrating agent and a retarding agent. The penetrating agent effects penetration of the composition almost instantaneously, while the retarding agent serves to retard the mothproofing action so as to make the entire mothproofing process extremely efficient.

The novel features which I consider characteristic of my invention are set forth with particularity in the appended claims. The invention itself, however, as to its composition, method of compounding and method of application, together with additional objects and advantages thereof, will best be understood from the description of a specific embodiment thereof which follows.

According to the preferred formula, I compound my improved mothproofing composition from the following ingredients and substantially in the proportions indicated:

| | Percent |
|---|---|
| Sodium fluoride | 48 |
| Sodium silicate | 7 |
| Sodium chloride | 34 |
| Mono sodium phosphate | 10 |
| "Nekal" | 1 |

The sodium silicate is preferably, although not necessarily, that known commercially as sodium silicate G C and consists of one part of $Na_2O$ with two parts of $SiO_2$, having the formula $Na_2O:2SiO_2$. The pH value of this silicate varies from 10.8 to 12, depending upon the concentration of the solution. The product known commercially as "Nekal" is essentially an alkylated aromatic sulphonic acid manufactured in accordance with the disclosure of U. S. Patent No. 1,737,792.

The composition may be formed by first mixing together the sodium fluoride, sodium silicate, sodium chloride, and sodium phosphate, and sprinkling over the resulting mix the "Nekal", either in dry state or in aqueous solution. The entire mixture is then placed in a ball mill and mixed until a uniform product results, the uniformity being tested from time to time by taking samples from different parts of the mill and testing the pH value thereof. When it is found that the mixture is uniform throughout, it may be packed either dry or in solution for the trade. The finished product should, preferably, have a pH value of approximately 7.1 or 7.2, and the ingredients thereof may be varied to result in a product having this pH value.

Although a product having a somewhat greater alkalinity is not objectionable, it should not be too alkaline, as this may weaken the fibers. However, the final product should produce a distinctly alkaline reaction in solution. A composition according to my invention will act as a cleanser by combining with any oil or grease that may be on the fiber and it thereby removes a serious obstacle to the penetration of the mothproofing solution when allowed to remain on the fabric. It will also neutralize any acids normally found on garments or the like and thus also help increase the life thereof.

The sodium fluoride and sodium silicate are used chiefly because of their toxic properties, the sodium silicate also having a tendency to make the fabric more water-resistant and thus helping to retain the toxic value of these constituents. Sodium chloride is employed essentially as a retarding agent to retard the mothproofing action and make it relatively slow. This makes the entire mothproofing reaction more efficient. To better aid the mothproofing reaction, I employ the mono sodium phosphate which acts as a cleanser for the fibers as well as bringing down the pH value so that the final product will have the desired alkalinity and will not weaken the cloth fibers. As for the "Nekal", this is also used to assist in the penetration of the solution into the fibers.

My improved composition may be placed in solution and applied directly to the fabric without any preliminary treatment thereof either by immersing the fabric therein and agitating it, or by spraying. The latter method readily lends itself to household use for mothproofing clothing, furs, furniture, rugs, curtains, draperies, etc. A marked phenomenon readily visible when my improved composition is applied by spraying is that the solution penetrates through the fibers almost instantaneously, whereas with prior art compositions, the solutions first form globules on the surface of the fabric and penetrate the fibers only with great difficulty, if at all.

Although I have described one specific embodiment of my invention, it will be apparent to those skilled in the art that many modifications thereof are possible. For example, in place of sodium fluoride, I may use other fluorides, such as the fluorides of any of the alkali metals, ammonium fluoride, or mixtures thereof, while any suitable silicate or silico-fluoride may be substituted for the sodium silicate herein specified. Also, the sodium chloride may be replaced by any other salt capable of serving the same function and the mono sodium phosphate may be replaced, for example, by trisodium phosphate. Moreover, the relative quantities of the respective ingredients may be varied at will, but the final product should, preferably, have a pH value of approximately 7.2. In any event, my invention is not to be limited except insofar as is necessitated by the prior art and by the spirit of the appended claims.

I claim as my invention:

1. A mothproofing composition comprising a mixture of sodium fluoride, sodium silicate, sodium chloride, mono sodium phosphate, and "Nekal" in substantially the following proportions:

| | Per cent |
|---|---|
| Sodium fluoride | 48 |
| Sodium silicate | 7 |
| Sodium chloride | 34 |
| Mono sodium phosphate | 10 |
| "Nekal" | 1 |

2. A mothproofing composition comprising a mixture of an alkali metal fluoride and sodium chloride in major proportions; and sodium silicate, sodium phosphate and "Nekal" in proportions to provide a composition having a pH value slightly greater than 7 in aqueous solution.

BERNARD L. LANDERS.